United States Patent Office 3,214,243
Patented Oct. 26, 1965

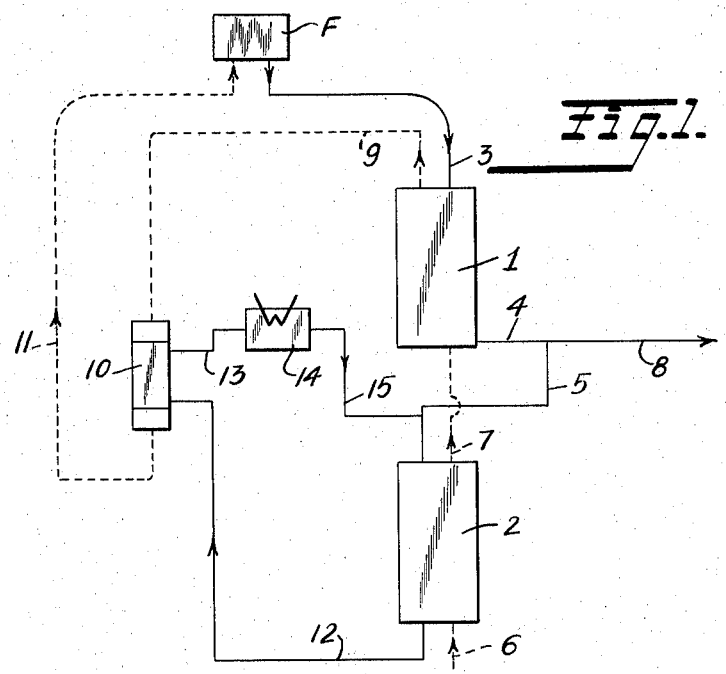
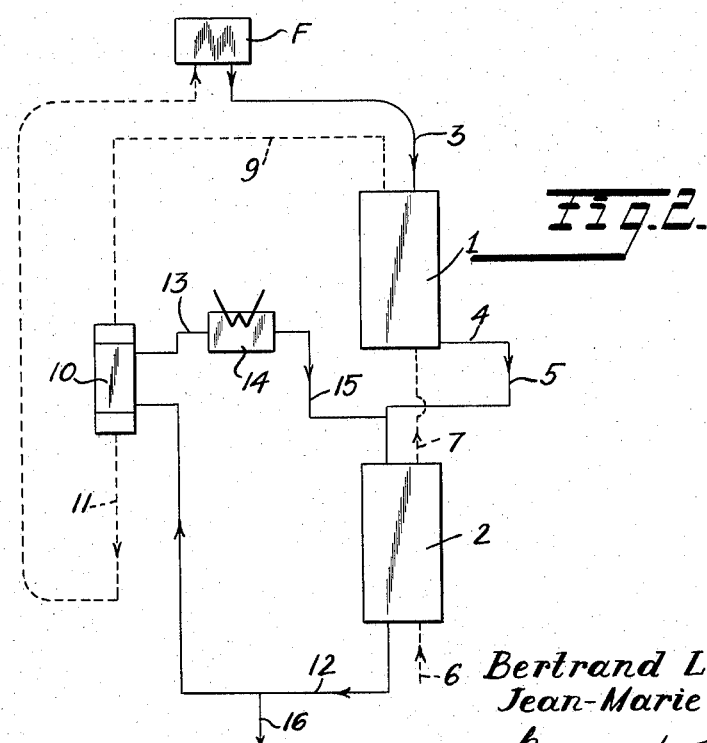

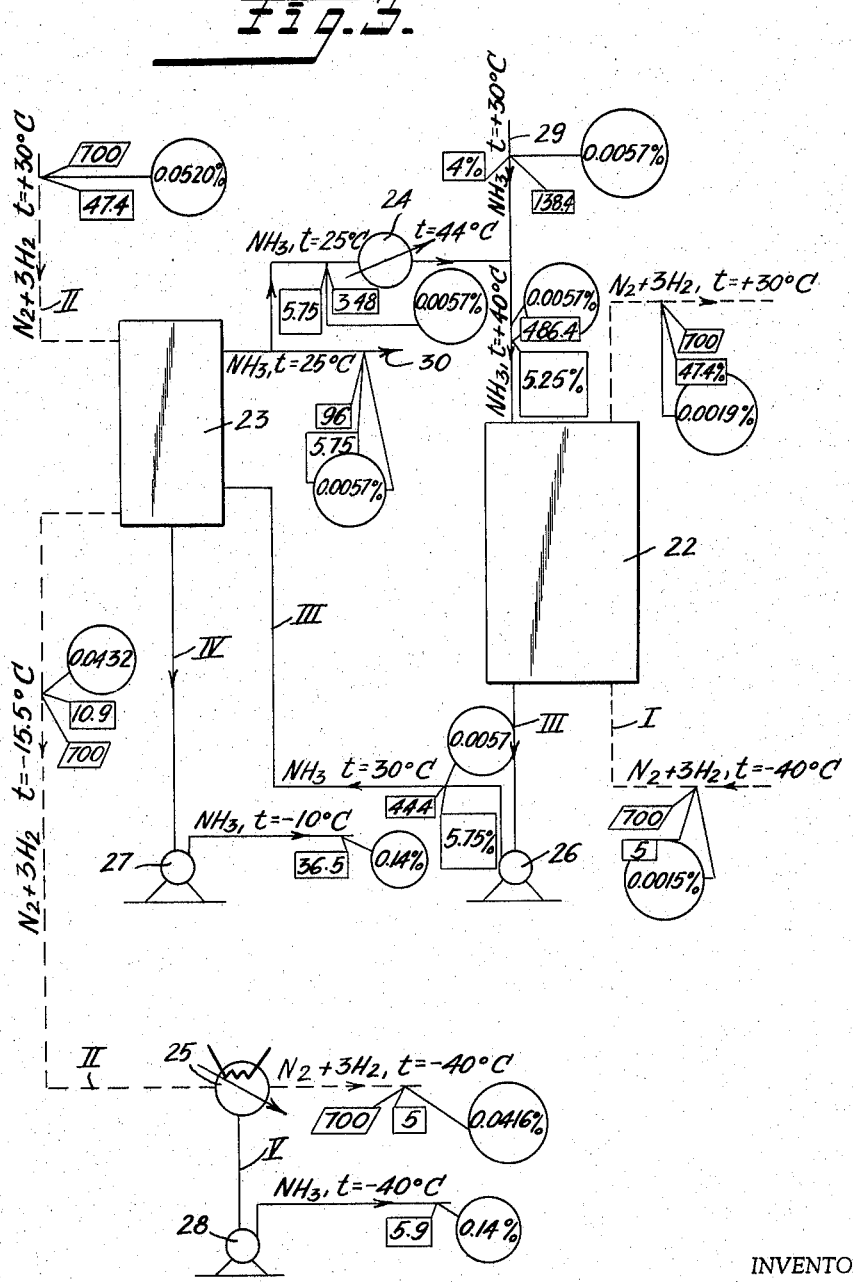

3,214,243
METHOD FOR THE BITHERMAL ISOTOPIC ENRICHMENT OF AMMONIA WITH DEUTERIUM
Bertrand Lazard and Jean-Marie Lerat, Paris, France, assignors to Houilleres du Bassin du Nord et du Pas-de-Calais, Douai, France, a French public establishment, and Commissariat a l'Energie Atomique, Paris, France
Filed Aug. 11, 1960, Ser. No. 48,883
Claims priority, application France, Aug. 28, 1959, 803,747
2 Claims. (Cl. 23—193)

The present invention relates to processes and installations intended for assuring the transfer of heat between a gaseous phase and a liquid phase by the process known as the direct contact process in which the transfer of heat is accompanied by transfer of materials. More particularly, it relates to a process allowing a gaseous phase to be saturated by the vapour of a liquid phase at a different temperature. Such a process is particularly applicable to installations intended for realising isotopic exchange between ammonia and a gaseous phase containing hydrogen, with a view to the transfer to the ammonia of the deuterium contained in said in said gaseous phase.

It is known that processes for the transfer of heat between a liquid phase and a gaseous phase can be conducted, either by means of surface exchangers, or by direct contact between the two phases.

The second process, although theoretically equivalent to the first, is preferable in the majority of cases, due to the fact that it does not have the disadvantages resulting from the obstruction to thermal transfer by the surfaces of the surface exchangers, nor from the fouling of these surfaces which leads to obstruction of the system.

The direct contact process has the further advantage of simultaneously permitting the transfer of materials, that is to say, as indicated above, the saturation of a gaseous phase by the vapour of a liquid phase.

Nevertheless, in this latter case, one sometimes encounters a disadvantage resulting from the necessity of the presence of an adjuvant favouring the reaction accompanying the thermal transfer and/or the transfer of materials. For example, in the case of isotopic exchange between hydrogen and ammonia, there are used catalysts constituted by the amides of alkali metals which must be carried with the liquid phase, namely the liquid ammonia. This amide is soluble in ammonia to a certain extent but it is not volatile, so that, even if the ammonia circulates in a closed circuit by being recovered in the gaseous phase by condensation of the latter, after the aforementioned isotopic exchange, the non-volatile adjuvant accumulates in the zone where the gaseous phase and the liquid are in contact, since it cannot be entrained by the gaseous phase at the time when the latter is saturated with ammonia.

This accumulation is a disadvantage, due to the fact that the adjuvant will finish by obstructing the channels and all the apparatus of the installation.

A solution to this problem would be the removal of the deposit of solid adjuvant at the place where it mainly accumulates, but this solution is difficult to carry out and presents an explosion risk when the adjuvant is an unstable product such as the amides of alkali metals .

The present invention has for its object a process allowing this disadvantage to be avoided.

The invention has consequently for its object a process for the saturation, by direct contact, of a gaseous phase by the vapour of a liquid charged with a non-volatile adjuvant constituted principally of a closed circuit for this liquid with addition into this circuit of a quantity of make-up liquid intended to compensate for the quantity taken up during the saturation of the gaseous phase, characterised in that, with a view of avoiding the accumulation, in said circuit, of non-volatile adjuvant with which said liquid is charged, there is introduced as the make-up liquid a quantity of said liquid charged with adjuvant equal to the quantity necessary at the saturation of the gaseous phase increased with a quantity at least sufficient to allow, by drawing off of the liquid more highly charged with adjuvant, at a point in the circuit situated after the saturation of the gaseous phase by the liquid, for the evacuation of a quantity of adjuvant at least equal to that which has been introduced thereto with the make-up liquid.

The invention more especially relates to the embodiment in which said process is applied to the case where the gaseous phase is a gaseous mixture containing hydrogen, the liquid is liquid ammonia and the adjuvant is a non-volatile compound catalysing the hydrogen-deuterium isotopic exchange, such as an amide of an alkali metal.

The invention will be better understood by reference to the following description corresponding to the accompanying drawing in which:

FIGURES 1 and 2 are fundamental diagrams illustrating the arrangement of a classical system in order to obtain the advantages of the invention, FIGURE 1 representing the classical system and FIGURE 2 the system according to the invention; and FIGURE 3 illustrates, in more detail, an installation for the saturation of the gas for the synthesis of ammonia $N_2+3H_2$ with ammonia vapour with a view to the enrichment of the ammonia with deuterium.

There is shown in FIGURE 1 the circulation diagram for an enrichment process by chemical exchange at two temperatures between water and hydrogen sulphide.

There is seen, in this figure, the hot tower 1 and the direct contact humidification tower 2. The water coming from the cold tower (represented at F) enters the hot tower by the pipe 3. It leaves the hot tower by the pipe 4. There is taken off by the pipe 5 the quantity of water exactly necessary for the saturation of the gas which enters the humidification tower 2 through the conduit 6 and leaves saturated through the pipe 7; the excess water leaving the hot tower is evacuated through the conduit 8.

In order to recover the heat contained in the saturated gases leaving the hot tower through the conduit 9, there is arranged an exchanger 10 through which the gas passes before it is sent to the base of the cold tower by the pipe 11.

After supplementary cooling (not shown in the figure), the gas returns to the cold tower by the conduit 11.

The recovery of the calories is effected by an auxiliary water circuit. The water leaving the humidification tower 2 is led to the exchanger 10 by means of a conduit 12 and leaves by means of a conduit 13 to be sent into an exchanger 14, reheated by industrial steam providing the make-up of calories necessary for the vapourisation of the saturation water.

From the exchanger 14, this water travelling in a closed circuit is fed into the top of the humidification tower through the conduit 15.

In the case shown, the water circuit is effected along 2, 12, 10, 13, 14, 15 and 5, the conduit 5, moreover, passing also the water coming from the hot tower 1.

It will be understood that in the case of an application such as that of the isotopic exchange at two temperatures of ammonia/hydrogen which implies the presence of a non-volatile catalyst in the dissolved state in the ammonia, the non-volatility of this catalyst will lead little by little to saturation, then to supersaturation of the ammonia in the aforementioned closed circuit, so that deposits of solids will form in the channels and apparatus with all the disadvantages which result therefrom.

To avoid this disadvantage, one could think of injecting into the aforementioned closed circuit a quantity of fresh ammonia equal to that of the saturation of the gaseous phase containing hydrogen. However, this solution it not applicable in practice by reason of the fact that the reaction which it is desired to establish, being a hydrogen-deuterium isotopic exchange, the deuterium content of the ammonia which would be injected as make-up into the cycle would not correspond to that of the ammonia which would be evacuated by a conduit analogous to conduit 8. One has thus been driven to find another solution. This solution rests in the fact that the content of non-volatile catalyst of the ammonia is less high at its entry into the humidification tower 2 than at its exit therefrom due to the fact that a part of the ammonia, being volatile, has been entrained by the gaseous phase containing hydrogen in the tower 2 without the corresponding catalyst having been entrained.

It thus results that the ammonia leaving by the conduit 12 is more charged with catalyst than that entering by the conduit 5.

The invention thus consists in realising the process illustrated in FIGURE 2 in which the same references designate the same elements.

There will thus be found in this figure the hot tower 1 and the humidification tower 2, the supply of ammonia coming from the cold tower (shown at F) through 3 and leaving through 4, then through 5 to go to the humidification tower 2. In the latter, the hydrogen enters through 6 and leaves saturated with ammonia through 7 to go to 1 from where it leaves through 9 to go to the heat exchanger 10 from where it passes through 11 to return to the cold tower. In this exchanger 10, the ammonia leaving the humidification tower through 12, enters in counter-current, this ammonia being reheated by passing in the reheater 14 before returning through 15 to the feed to the humidification tower 2. The path of the ammonia is thus again 2, 12, 10, 13, 14, 15 and 5, it being understood that in the humidification tower 2, a part of this ammonia is entrained by the hydrogen so that its content of the catalyst which favours the isotopic exchange is found to be increased.

According to the invention, there is provided at the exit of the tower 2, that is to say in the conduit 12, a connection 16 through which there is taken off, in a continuous or non-continuous manner, the quantity of excess ammonia coming from the main enrichment circuit 3, 4, 5 and which, in view of the above, evacuates at the same time the catalyst accumulated by reason of the entrainment, in the tower 2, of the corresponding quantity of ammonia which dissolved it.

It will be noted that in consequence of the drawing off at 16, the conduit 8 is no longer necessary. The arrangement of FIGURE 2 results in the following advantages:

Absence of disturbance of the isotopic compositions,
Normal circulation of the excess catalyst and normal circulation of the excess ammonia,
Maintenance of all the energy advantages of diagram 1,
Absence of any danger of blocking the apparatus by the accumulation of solid catalyst,
Absence of handling the catalyst in the solid state and of the disadvantages which would result therefrom.

Referring to the diagram of FIGURE 3, there will now be described an example for carrying out a process for the saturation, by direct contact, of a gaseous mixture, consisting of the gas for the synthesis of ammonia $N_2$ and $3H_2$, with the vapour of a liquid consisting of liquid $NH_3$ containing a non-volatile adjuvant consisting of an alkali amide. The practical arrangements which will be described with regard to this example must be considered as forming part of the invention, it being understood that any equivalent arrangements could also be used without departing from the scope of the invention.

This example relates to an installation for the saturation and the desaturation of the synthesis gas $N_2+3H_2$ with ammonia vapour. This gaseous mixture is used in an installation for the enrichment of ammonia with deuterium. FIGURE 3 shows the principal exchanger 22 of the direct contact type, the secondary exchanger 23 of the surface type, the reheater 24, the cooler 25, the circulation pumps 26, 27 and 28 and the following circuits:

*Circuit I.*—Circuit for the synthesis gas $N_2+3H_2$ which enters cold into the installation and which leaves it warm and saturated with $NH_3$.

*Circuit II.*—Circuit for the synthesis gas $N_2+3H_2$ which enters the installation warm and saturated with $NH_3$ and leaves it cold.

*Circuit III.*—Circuit for the saturation liquid which is, in the example, liquid ammonia containing a non-volatile catalyst in solution. This circuit comprises a feed 29 and a drain 30.

*Circuit IV.*—Drain circuit for the condensate of the secondary exchanger 23.

*Circuit V.*—Drain circuit for the condensate from the cooler 25.

There is further seen in this figure:

The flows of $N_2+3H_2$ expressed in kilomoles per hour, inscribed in parallelograms.
The flows of ammonia expressed in kilomoles per hour, inscribed in rectangles.
The catalyst concentrations expressed as ponderal percentages, inscribed in squares.
The atomic percentages $$\frac{\text{Deuterium}}{\text{Hydrogen}}$$

inscribed in circles; for the saturated gaseous phase, it is the total concentration of deuterium which is indicated.

It is pointed out, in particular, that the total of the quantities of $NH_3$ of the drain circuits IV and V is equivalent to the quantities of $NH_3$ necessary for the saturation of the gaseous phase of circuit I, which would appear to make them usable for this. However, the very high deuterium concentration of this $NH_3$ makes it unsuitable for this use, in particular for reasons of efficiency of the isotopic exchange installation. This is why, in order to avoid too large a loss of deuterium, there is used for the saturation in the principal exchanger 22, $NH_3$ with a low deuterium concentration.

The functioning of this system is as follows:

In circuit I the synthesis gas $N_2+3H_2$ arrives in the installation, which functions under a pressure of 500 kgs./cm.$^2$, at a temperature of $-40°$ C., and leaves it at a temperature of $+30°$ C. The flow of this synthesis gas is 700 kilomoles per hour, and the flow of $NH_3$ in the same circuit is led, in the principal exchanger 22, from 5 kilomoles per hour to 47.4 kilomoles per hour.

In circuit III the liquid ammonia circulates in a loop, traversing in turn the principal exchanger 22, where it saturates the synthesis gas, the circulation pump 26, the secondary exchanger 23 and the reheater 24. In this loop the flow of $NH_3$ is:

486.4 kilomoles per hour at its entry into the principal exchange 22, due to the make-up of 138.4 kilomoles per hour coming from the feed 29.
444 kilomoles per hour at its exit from the principal exchanger 22, due to the fact that ammonia is given up to the synthesis gas of circuit I.
348 kilomoles per hour at its entry into the reheater 24, as a result of 96 kilomoles per hour to the drain 30.

The temperatures of this liquid ammonia are, moreover, the following:

$+30°$ C. at the feed,
$+40°$ C. at the entry to the principal exchanger 22,
$-30°$ C. at the exit from the principal exchanger 22, +25° C. at the drain 30 and at the entry to the reheater 24,
+44° C. at the exit from the reheater 24.

It is seen that the quantity of liquid ammonia permanently conveyed in circuit III represents about one third of the quantity circulating in the principal exchanger 22 and three times the quantity necessary for the saturation of the synthesis gas of circuit I. The quantity of liquid ammonia drained at 30 represents twice that quantity necessary for saturation.

The second part of the installation, circuits II, IV and V, secondary exchanger 23, cooler 25, pumps 27 and 28, allows the desaturation of the synthesis gas of circuit II by the cooling and the recovery of the liquid ammonia which it contains.

What we claim is:

1. A method for the bithermal isotopic enrichment of ammonia with deuterium which comprises establishing a countercurrent flow of a gas phase containing hydrogen and a liquid ammonia phase charged with an alkali metal amide as a non-volatile adjuvant in a countercurrent system comprising at least two stages; effecting isotopic deuterium exchange between said streams in a first stage and exchanging heat between the gas and liquid streams in a second stage while simultaneously saturating said hydrogen gas stream with vapors of ammonia wherein said adjuvant ammonia stream is continuously circulating and directly contacts in a portion of its cycle in the second stage when at a temperature of about 30° C. said gas stream at a temperature of about −40° C. whereby by means of said 70° C. temperature differential there is an exchange of heat between said streams and a sufficient portion of said liquid ammonia is vaporized to saturate said gas therewith and to increase the concentration of said adjuvant in said liquid; adding to said liquid prior to its direct contact with said gas in said second cycle a quantity of liquid containing adjuvant in a lower concentration than in said circulating liquid; and withdrawing a portion of deuterium enriched liquid charged with adjuvant subsequent to its contact with said gas, the amount of said added liquid being equal to the amount of liquid carried off as vapor plus the amount of liquid withdrawn subsequent to contact with said gas, and the amount of adjuvant contained in said added liquid being no greater than the amount of adjuvant in the withdrawn liquid whereby saturation of said continuously circulating liquid with said non-volatile adjuvant and precipitation therefrom is prevented.

2. The process of claim 1 wherein the liquid is ammonia and the gas is a mixture of nitrogen and hydrogen in the proportion $N_2:3H_2$.

References Cited by the Examiner

UNITED STATES PATENTS

| 2,741,543 | 4/56 | Urey | 23—204 |
| 2,895,803 | 7/59 | Spevack | 23—204 |
| 3,028,222 | 4/62 | Eriksson | 23—204 |

FOREIGN PATENTS

| 807,803 | 1/59 | Great Britain. |

MAURICE A. BRINDISI, *Primary Examiner.*